(12) United States Patent
Hasegawa et al.

(10) Patent No.: US 10,326,368 B2
(45) Date of Patent: Jun. 18, 2019

(54) POWER SUPPLY DEVICE

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Takeshi Hasegawa, Yokkaichi (JP); Takenori Abe, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/094,115

(22) PCT Filed: Jan. 25, 2017

(86) PCT No.: PCT/JP2017/003531
§ 371 (c)(1),
(2) Date: Oct. 16, 2018

(87) PCT Pub. No.: WO2017/183243
PCT Pub. Date: Oct. 26, 2017

(65) Prior Publication Data
US 2019/0123647 A1      Apr. 25, 2019

(30) Foreign Application Priority Data
Apr. 22, 2016   (JP) .................................. 2016-085837

(51) Int. Cl.
*H02M 3/158*          (2006.01)
*H02M 3/157*          (2006.01)
(Continued)

(52) U.S. Cl.
CPC ............. *H02M 3/158* (2013.01); *H02M 1/08* (2013.01); *H02M 3/157* (2013.01); *H02M 2001/0009* (2013.01); *H02M 2003/1566* (2013.01)

(58) Field of Classification Search
CPC ........ H02M 1/08; H02M 1/156; H02M 1/157; H02M 1/158; H02M 2003/156;
(Continued)

(56) References Cited

U.S. PATENT DOCUMENTS 7,358,712 B2 *   4/2008   Shimizu ............. H05B 41/2856
                                                              315/308
2010/0277149 A1   11/2010  Furutani et al.
(Continued)

FOREIGN PATENT DOCUMENTS

EP         0390079 A2 *   10/1990   .............. H02J 7/008
JP         2010239686  *  10/2010   .............. H02M 7/48
(Continued)

OTHER PUBLICATIONS

Mar. 14, 2017 International Search Report issued in International Patent Application No. PCT/JP2017/002531.

*Primary Examiner* — Matthew V Nguyen
(74) *Attorney, Agent, or Firm* — Oliff PLC (57) ABSTRACT

A power supply device that can perform feedback control with high responsivity when an output current greatly changes is realized with a configuration that can further reduce power consumption. A power supply device is configured to (i) detect a current change ratio $\Delta I_r$ of a current output from a voltage conversion unit; (ii) determine a (Continued)

processing speed in such a manner that the larger the detected current change ratio $\Delta I_r$ is, the higher the processing speed is; and (iii) compute a duty ratio of a PWM signal that is to be supplied, based on a predetermined target values $I_{ta}$ and $V_{ta}$ and a current value $I_{out}$ and a voltage value $V_{out}$, and that outputs, a PWM signal that has been set so as to have the duty ratio obtained through the computation.

2 Claims, 6 Drawing Sheets

(51) Int. Cl.
  *H02M 1/08* (2006.01)
  *H02M 3/156* (2006.01)
  *H02M 1/00* (2006.01)

(58) Field of Classification Search
  CPC ... H02M 2003/1566; H02M 2003/158; H02M 2001/0009
  See application file for complete search history.

(56) References Cited

U.S. PATENT DOCUMENTS

| | | | |
|---|---|---|---|
| 2012/0146596 A1* | 6/2012 | Lin | ........................ H02M 3/156 323/265 |
| 2016/0261188 A1 | 9/2016 | Wang | |
| 2019/0020336 A1* | 1/2019 | Abe | ........................ H02M 3/158 |

FOREIGN PATENT DOCUMENTS

| | | |
|---|---|---|
| JP | 5175642 B2 | 4/2013 |
| JP | 2014-135176 A | 7/2014 |
| WO | 2009/90755 A1 | 7/2009 |
| WO | 2014/187424 A1 | 11/2014 |

\* cited by examiner

POWER SUPPLY DEVICE

TECHNICAL FIELD

The present disclosure relates to a power supply device.

BACKGROUND ART

As an example of a power supply device that aims to stabilize an output voltage at a desirable target voltage, technology disclosed in, for example, Patent Document 1 has been proposed. A power supply control device according to Patent Document 1 includes a digital control circuit unit that performs digital control based on information regarding a difference between an output voltage that is supplied to a power supply control target device and a reference voltage so that the output voltage is equal to the reference voltage.

CITATION LIST

Patent Document

Patent Document 1: JP 5175642B2

SUMMARY

Technical Problem

This type of power supply device stabilizes an output voltage or an output current so as to be close to a target value, by performing feedback control while monitoring output. However, output from the power supply device is affected by the state of a load, and if the state of a load greatly changes, an output voltage and an output current are likely to greatly change. In such a case where the output greatly changes depending on the state of a load, if the processing speed of a control circuit that performs feedback control is low, there is a concern that the output will not be stable enough. Therefore, it is desirable that the control circuit can operate at a processing speed that is based on the assumption that the output will vary depending on changes in the state of a load. However, there is a problem in which, if the control circuit continuously operates at a high processing speed that is based on the assumption that the output will vary, the power consumption of the control circuit increases.

In this regard, Patent Document 1 proposes technology that can be a reference for solving the aforementioned problem. A power supply control device according to Patent Document 1 is set to be active if the load on a functional block that is provided in a target (a power supply control target device), and thus output therefrom is input to a power supply control circuit so that changes in an output voltage, caused by changes in the load on the power supply control target device, are suppressed. In contrast, if the load on the power supply control target device does not change, the operation clock signal of the processor is stopped so that the processor of a digital control circuit unit is stopped, and thus low power consumption is realized. Specifically, a control signal output from the target (the power supply control target device) is input to the power supply control device, and, in the power supply control device, a processor in a digital control circuit operates in response to a transition of the control signal. The output from the digital control circuit unit is monitored within the power supply control device, and the operation of the processor of the digital control circuit unit is stopped if it is determined that the load on the target (the power supply control target device) will not change.

However, the configuration of the power supply control device according to Patent Document 1 is based on the premise that a control signal (a functional block clock active signal) is transmitted from the target (the power supply control target device), to which an output voltage from the power supply control device is applied, via a path that is different from an output path (a power line through which the output voltage is applied). That is, Patent Document 1 is only applicable to a configuration in which such a control signal is output via a path that is different from a power line to which an output voltage is applied. In addition, such a control signal is more or less delayed from a change in an output voltage or an output current. Therefore, if a change in an output voltage or an output current is detected based on the control signal, a feedback delay will occur.

The present disclosure has been made in view of the above-described situation, and aims to provide a power supply device that can perform highly responsive feedback control when an output current greatly changes, using a configuration that can further reduce power consumption.

Solution to Problem

A power supply device according to the present preferred embodiment includes:

a voltage conversion unit that steps up or steps down an input voltage, using a switching element that performs ON and OFF operations in response to a PWM signal, and outputs a resulting voltage;

a change ratio detection unit that detects a change ratio of a current output from the voltage conversion unit;

a processing speed determination unit that determines a processing speed in such a manner that the larger the change ratio detected by the change ratio detection unit is, the higher the speed is; and a control unit that is configured to operate at the processing speed determined by the processing speed determination unit, that computes a duty ratio of a PWM signal that is to be supplied to the voltage conversion unit, based on a predetermined target value and an output value from the voltage conversion unit, and that performs feedback control to output, to the voltage conversion unit, a PWM signal that has been set so as to have the duty ratio obtained through the computation.

Advantageous Effects

This power supply device detects the change ratio of a current output from the voltage conversion unit, using the change ratio detection unit, and the processing speed determination unit determines the processing speed in such a manner that the greater the current change ratio detected by the change ratio detection unit is, the higher the speed is. Then, the control unit operates at the processing speed determined by the processing speed determination unit. With this configuration, when the change ratio of an output current becomes relatively large due to changes in a load, the processing speed of the control unit can be increased so as to be relatively high. That is, when the output current greatly changes, it is possible to improve the ability to follow the target value by increasing the processing speed, and thus it is possible to reliably prevent stability from being degraded due to changes in a load, for example. In addition, the processing speed is determined based on the change ratio of the current output from the voltage conversion unit, and therefore, when the processing speed determination unit determines the processing speed, the processing speed more swiftly reflects the state of a change in the output current, and thus the responsivity of feedback control can be improved. On the other hand, when the change ratio of the output current is relatively small, it is possible to reduce the processing speed of the control unit so as to be relatively low. That is, in a situation where the change ratio of the output current is relatively small and stability is unlikely to be degraded, it is possible to keep the processing speed of the control unit low to reduce power consumption.

Therefore, it is possible to realize a power supply device that can perform feedback control with high responsivity when an output current greatly changes, with a configuration that can further reduce power consumption.

EMBODIMENTS

The following describes preferable examples.

The processing speed determination unit may be configured to determine that the processing speed is to be a first processing speed when the change ratio detected by the change ratio detection unit is greater than a predetermined first threshold value and the value of a current output from the voltage conversion unit is greater than a predetermined second threshold value, and to determine that the processing speed is to be a second processing speed that is lower than the first processing speed when the change ratio detected by the change ratio detection unit is no greater than the first threshold value, or when the value of a current output from the voltage conversion unit is no greater than the second threshold value.

The influence of changes in the output caused by changes in a load, for example, is more likely to be problematic when the output current is relatively large than when the output current is relatively small. With the present configuration, in a situation where the output current is relatively large and the output current is relatively large, it is possible to give a higher priority to the processing speed and improve the ability to follow the target value so that the above-described problem is less likely to occur. In contrast, even if the change ratio of the output current is relatively large, in a situation where the output current is relatively small, it is possible to preferentially reduce power consumption by keeping the processing speed low.

The processing speed determination unit may be configured such that, after switching the processing speed from the second processing speed to the first processing speed, the processing speed determination unit prohibits switching from the first processing speed to the second processing speed for at least a predetermined period of time, and after the predetermined period of time has elapsed from when the processing speed was switched from the second processing speed to the first processing speed, the processing speed determination unit switches the processing speed from the first processing speed to the second processing speed when the current change ratio detected by the change ratio detection unit is no greater than the first threshold value or when the value of a current output from the voltage conversion unit is no greater than the second threshold value.

In this way, after the processing speed has been switched from the second processing speed to the first processing speed, switching from the first processing speed to the second processing speed is prohibited for at least a predetermined period of time. Thus, it is possible to reduce the frequency at which the processing speed is switched to the relatively low processing speed (the second processing speed), and it is possible to prevent followability from decreasing due to the processing speed frequently switching to the second processing speed.

First Embodiment

The following describes a first embodiment, which is a specific example.

Figure 1:
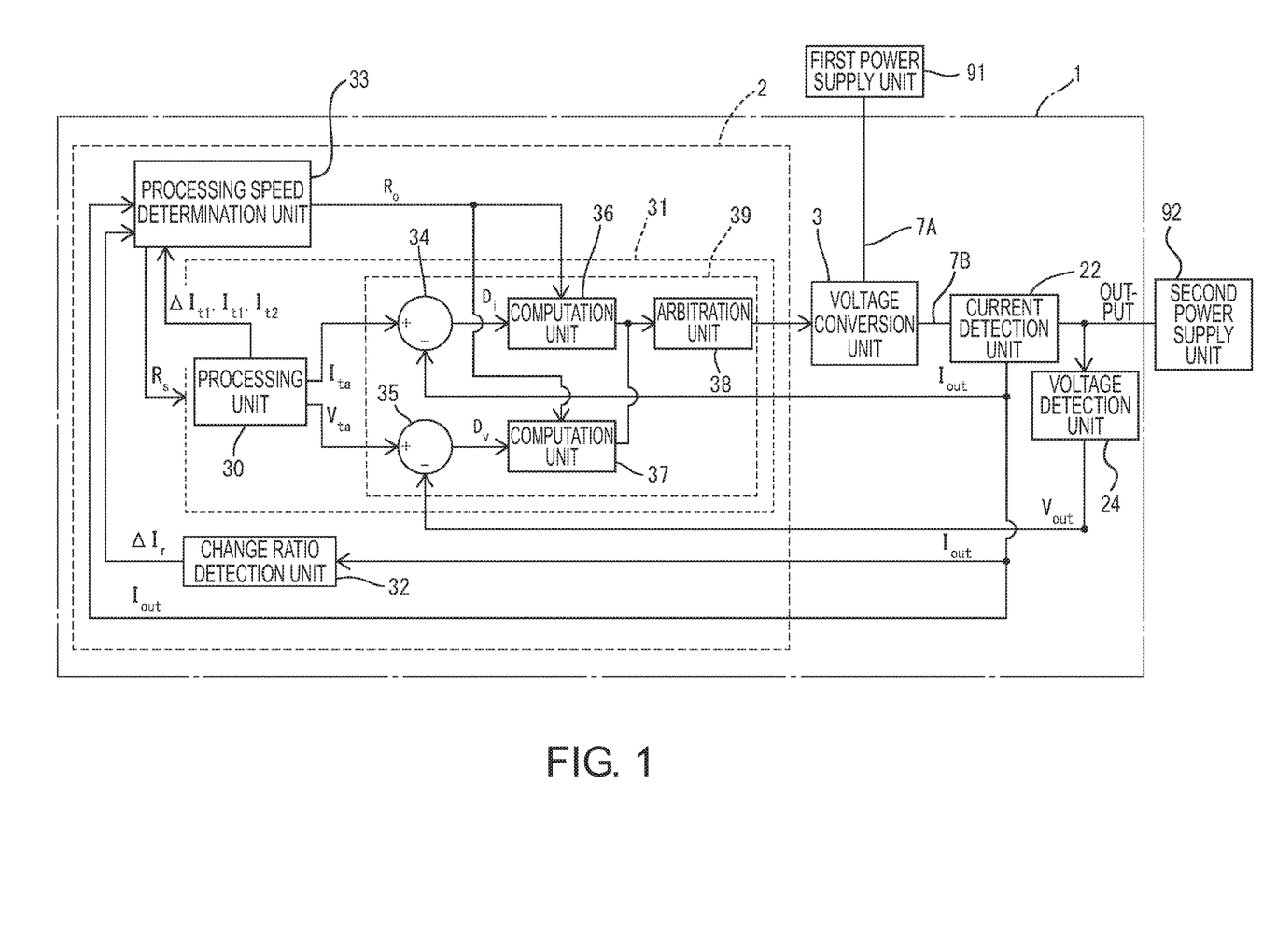
FIG. 1 is a block diagram schematically showing a power supply device according to a first embodiment.

A power supply device 1 shown in FIG. 1 is configured as, for example, an on-board power supply device mounted on a vehicle. The power supply device 1 includes a control device 2, a voltage conversion unit 3, a current detection unit 22, a voltage detection unit 24, and so on, and has the function of outputting an output voltage that has been generated by stepping up or stepping down a DC voltage (an input voltage) input to an input-side conductive path 7A, to an output-side conductive path 7B.

The input-side conductive path 7A is configured as a primary-side power line to which a DC voltage is applied by a first power supply unit 91, and is electrically connected to a high potential-side terminal of the first power supply unit 91. The first power supply unit 91 is constituted by a lead-acid battery, for example. Note that an alternator and so on are also connected to the input-side conductive path 7A to which the first power supply unit 91 is connected.

The output-side conductive path 7B is configured as a secondary-side power line to which a DC voltage is applied by a second power supply unit 92, and is electrically connected to a high potential-side terminal of the second power supply unit 92. The second power supply unit 92 is constituted by a power storage device such as a lithium ion battery or an electric double-layer capacitor.

The voltage conversion unit 3 is configured to, as a result of a switching element (e.g. a MOSFET) performing ON and OFF operations in response to a PWM signal, step up or step down an input voltage applied to the input-side conductive path 7A, and output the resulting voltage to the output-side conductive path 7B. The voltage conversion unit 3 is configured as, for example, a synchronous rectification type DC to DC converter. The voltage conversion unit 3 may be, for example, a step-up type converter in which a switching element that is controlled in response to a PWM signal performs ON and OFF operations to step up an input voltage applied to the input-side conductive path 7A, and outputs the resulting voltage to the output-side conductive path 7B, or a step-down type converter in which a switching element that is controlled in response to a PWM signal performs ON and OFF operations to step down an input voltage applied to the input-side conductive path 7A, and outputs the resulting voltage to the output-side conductive path 7B. Alternatively, the voltage conversion unit 3 may be a step-up and step-down type converter that switches to a mode (a step-up mode) in which a switching element steps up an input voltage applied to the input-side conductive path 7A and outputs the resulting voltage to the output-side conductive path 7B, and to a mode (a step-down mode) in which the switching element steps down an input voltage applied to the input-side conductive path 7A and outputs the resulting voltage to the output-side conductive path 7B. Alternatively, the voltage conversion unit 3 may be a bidirectional step-up and step-down type converter that switches to a mode in which a switching element steps up or steps down an input voltage applied to the conductive path 7A and outputs the resulting voltage to the conductive path 7B, and to a mode in which the switching element steps up or steps down an input voltage applied to the conductive path 7B and outputs the resulting voltage to the conductive path 7A.

The following describes, as a representative example from among these examples, an example of a bidirectional step-up and step-down type converter that switches to a step-up mode in which a switching element steps up an input voltage applied to the conductive path 7A and outputs the resulting voltage to the conductive path 7B, and to a step-down mode in which the switching element steps down an input voltage applied to the conductive path 7B and outputs the resulting voltage to the conductive path 7A. Descriptions with reference to FIG. 1 and so on focus on a mode (a step-up mode) in which a switching element steps up an input voltage applied to the conductive path 7A and outputs the resulting voltage to the conductive path 7B. However, this is merely an example, and the present invention is not limited to this example as a matter of course.

The current detection unit 22 can detect a current flowing through the output-side conductive path 7B, and output a value corresponding to the magnitude of a voltage output from the voltage conversion unit 3. Specifically, the current detection unit 22 only needs to be configured to output, as a detection value, a voltage value corresponding to a current flowing through the output-side conductive path 7B. For example, the current detection unit 22 includes a resistor and a differential amplifier provided on the output-side conductive path 7B, and is configured such that a voltage across the resistor is input to the differential amplifier, and the amount of a voltage drop occurring in the resistor due to a current flowing through the output-side conductive path 7B is amplified by the differential amplifier and is output as a detection value.

The voltage detection unit 24 can detect an output voltage across the output-side conductive path 7B, and output a value corresponding to the magnitude of the output voltage. Specifically, the voltage detection unit 24 outputs a value that reflects a voltage across the output-side conductive path 7B (e.g. the voltage across the output-side conductive path 7B without change, the value of a divided voltage, or the like).

In the following description, the value of a current flowing through the output-side conductive path 7B, which is specified based on a detection value output from the current detection unit 22, is referred to as a "current value $I_{out}$", and the value of a voltage across the output-side conductive path 7B, which is specified based on a detection value output from the voltage detection unit 24, is referred to as a "voltage value $V_{out}$".

As shown in FIG. 1, the control device 2 includes a control unit 31, a change ratio detection unit 32, and a processing speed determination unit 33.

The control unit 31 is configured as a microcomputer, for example, and includes a CPU, a ROM, a RAM, a non-volatile memory, and so on. The control unit 31 has the function of a processing unit 30 and the function of a drive unit 39. The control unit 31 has the function of computing a duty ratio of a PWM signal that is supplied to the voltage conversion unit 3, based on predetermined target values (a target value $I_{ta}$ and a target value $V_{ta}$) and on output values (the current value $I_{out}$ and the voltage value $V_{out}$) from the voltage conversion unit 3, and outputting a PWM signal that has the duty ratio obtained as the result of the computation, to the voltage conversion unit 3. The control unit 31 is configured to operate at a processing speed that has been determined by the processing speed determination unit 33, which will be described later.

The processing unit 30 includes a CPU, for example, and processes a current change ratio threshold value $\Delta I_{r1}$, which is a first threshold value, a low output current threshold value $I_{t1}$, a high output current threshold value $I_{t2}$, which is a second threshold value, a target value $I_{ta}$ of a current output from the voltage conversion unit 3 (hereinafter referred to as a "target value $I_{ta}$"), and a target value $V_{ta}$ of a voltage output from the voltage conversion unit 3 (hereinafter referred to as a "target value $V_{ta}$"). The target value $I_{ta}$ and the target value $V_{ta}$ are values that have been determined by the control unit 31 in advance.

The drive unit 39 performs feedback control so that a current and a voltage output from the voltage conversion unit 3 are of a predetermined magnitude. Specifically, the drive unit 39 determines the amount of control (hereinafter referred to as a "duty ratio") by performing well-known PID control type feedback computation based on the current value $I_{out}$ and the voltage value $V_{out}$ of the output-side conductive path 7B and the target value $I_{ta}$ and the target value $V_{ta}$. Then, the drive unit 39 outputs a PWM signal that has the duty ratio thus determined, to the switching element of the voltage conversion unit 3.

The change ratio detection unit 32 has the function of detecting the change ratio of a current output from the voltage conversion unit 3. The change ratio detection unit 32 monitors the current value $I_{out}$ output from the current detection unit 22, and can compute and output a current change ratio $\Delta I_r$ per unit time (hereinafter referred to as a "current change ratio $\Delta I_r$") of a current flowing through the output-side conductive path 7B. That is, the change ratio detection unit 32 can detect the current change ratio $\Delta I_r$ of a current output from the voltage conversion unit 3.

The processing speed determination unit 33 has the function of determining the processing speed in such a manner that the greater the current change ratio $\Delta I_r$ detected by the change ratio detection unit 32 is, the higher the speed is. The processing speed determination unit 33 determines the processing speed based on the current value $I_{out}$ specified by the detection value detected by the current detection unit 22, the current change ratio $\Delta Ir$ detected by the change ratio detection unit 32, and the current change ratio threshold value $\Delta I_{t1}$, the low output current threshold value $I_{t1}$, and the high output current threshold value $I_{t2}$ acquired by the processing unit 30. Specifically, the processing speed determination unit 33 has the function of outputting a wake-up signal $R_s$ and a computation speed change request signal $R_o$, which will be described later, upon setting each of them to either a low level L or a high level H based on the current value $I_{out}$, the current change ratio $\Delta_{Ir}$, the current change ratio threshold value $\Delta I_{t1}$, the low output current threshold value $I_{t1}$, and the high output current threshold value $I_{t2}$.

The wake-up signal $R_s$ is used to switch the control unit 31 to a sleep state or a low speed state, for example. The computation speed change request signal $R_o$ is used to change the processing speed of the drive unit 39, for example.

Figure 2:
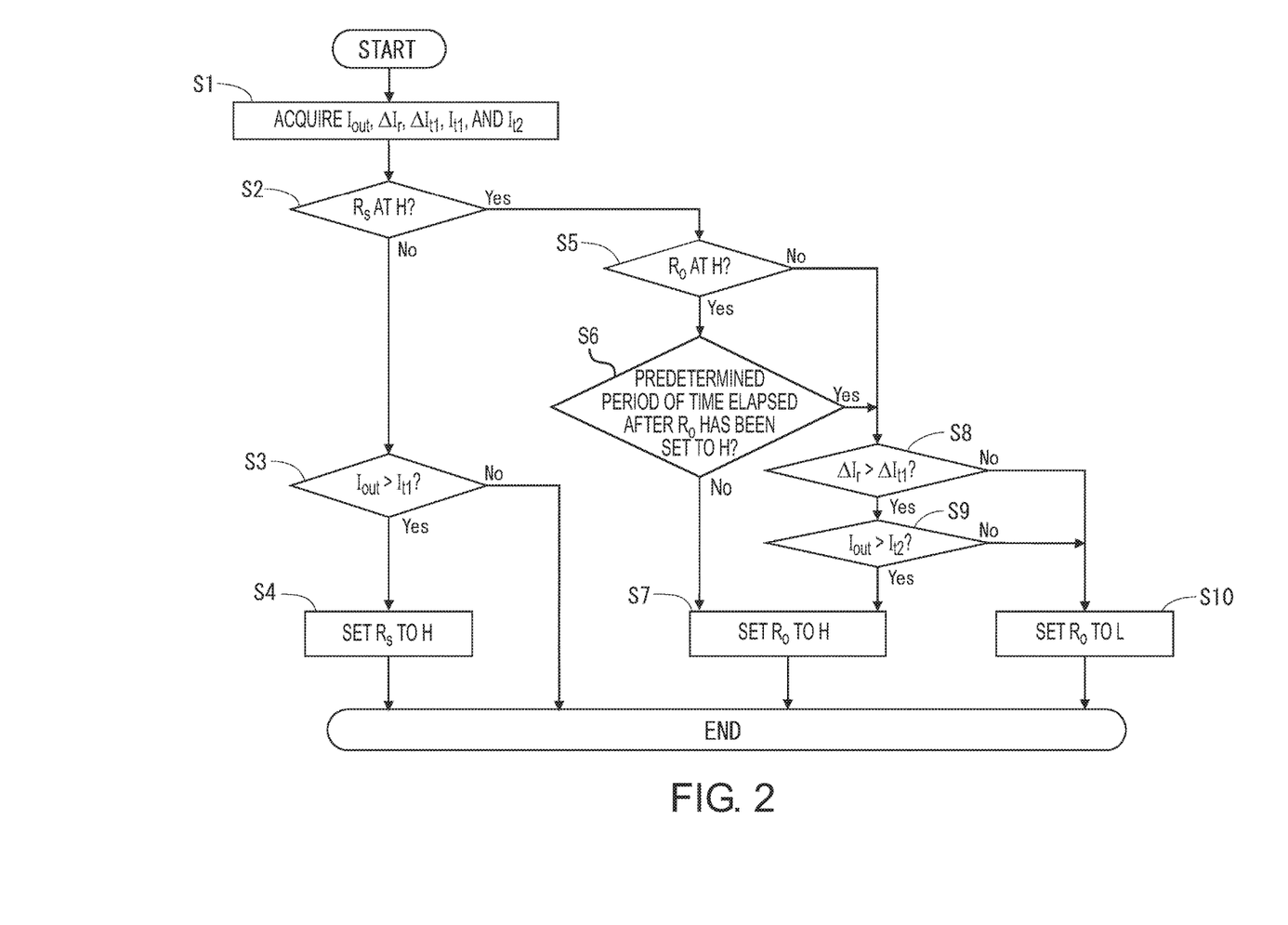
FIG. 2 is a flowchart illustrating a flow of control that is performed by a processing speed determination unit included in the power supply device according to the first embodiment, using a wake-up signal and a computation speed change request signal.

Next, the following describes operations of the processing speed determination unit 33 with reference to FIG. 2 and so on.

Determination processing shown in FIG. 2 is cyclical processing performed by the processing speed determination unit 33 once every short period of unit time. The processing speed determination unit 33 starts the control shown in FIG. 2 upon a predetermined start condition being satisfied (e.g. upon an ignition signal switching from OFF to ON), and thereafter cyclically performs the control shown in FIG. 2.

After starting the determination processing shown in FIG. 2, the processing speed determination unit 33 first acquires the current value $I_{out}$ output from the current detection unit 22, the current change ratio $\Delta I_r$ detected by the change ratio detection unit 32, the current change ratio threshold value $\Delta I_{t1}$, the low output current threshold value $I_{t1}$, and the high output current threshold value $I_{t2}$ (step S1). Note that the current change ratio threshold value $\Delta I_{t1}$, the low output current threshold value $I_{t1}$, and the high output current threshold value $I_{t2}$ may be stored as part of a program that is executed to realize the processing shown in FIG. 2, or separately stored in a memory or the like and acquired through the processing performed in step S1.

After step S1, the processing speed determination unit 33 determines whether or not the wake-up signal $R_s$ is at the high level (step S2).

Upon determining in step S2 that the wake-up signal $R_s$ is not at the high level, the processing speed determination unit 33 determines whether or not the current value $I_{out}$ acquired based on a detection value detected by the current detection unit 22 is greater than the low output current threshold value $I_{t1}$ (step S3). Upon determining in step S3 that the current value $I_{out}$ is greater than the low output current threshold value $I_{t1}$, the processing speed determination unit 33 sets the wake-up signal $R_s$ to the high level (step S4), and thereafter ends the determination processing shown in FIG. 2 and performs processing from step S1 again. Upon determining in step S3 that the current value $I_{out}$ is not greater than the low output current threshold value $I_{t1}$, the processing speed determination unit 33 ends the determination processing shown in FIG. 2 and performs processing from step S1 again.

In this way, the processing speed determination unit 33 keeps the wake-up signal $R_s$ at the low level during a period of time in which the current value $I_{out}$ is no greater than the low output current threshold value $I_{t1}$, and keeps the wake-up signal $R_s$ at the high level when the current value $I_{out}$ is greater than the low output current threshold value $I_{t1}$.

Note that, regarding the control unit 31, the wake-up signal $R_s$ is set to the low level upon a predetermined sleep condition being satisfied (e.g. upon the current value $I_{out}$ being no greater than the low output current threshold value $I_{t1}$, or upon the current value $I_{out}$ being no greater than the low output current threshold value It1 and a predetermined condition being satisfied) and the control unit 31 is configured to switch to the sleep state at such time. In the sleep state, the processing speed of the control unit 31 is set to a third processing speed that is lower than a second processing speed described later. Also, in the sleep state, most of the functions of the control unit 31 may be stopped.

Upon determining in step S2 that the wake-up signal $R_s$ is at the high level, the processing speed determination unit 33 performs the processing in step S5 to determine whether or not the computation speed change request signal $R_o$ is at the high level.

Upon determining in step S5 that the computation speed change request signal $R_o$ is at the high level, the processing speed determination unit 33 performs the processing in step S6 to determine whether or not a predetermined period of time (e.g. 10 ms) has elapsed after the computation speed change request signal $R_o$ has been set to the high level (i.e. whether or not a period of time for which the computation speed change request signal $R_o$ has been kept at the high level has exceeded the predetermined period of time).

Upon determining in step S6 that the period of time that has elapsed from when the computation speed change request signal $R_o$ was set to the high level has not reached the predetermined period of time, the processing speed determination unit 33 performs the processing in step S7 to set the computation speed change request signal $R_o$ to the high level and ends processing in such a setting state. After the processing in step S7, the processing speed determination unit 33 performs processing from step S1 again.

Upon determining in step S5 that the computation speed change request signal $R_o$ is not at the high level, or determining in step S6 that the period of time that has elapsed from when the computation speed change request signal $R_o$ was set to the high level has reached the predetermined period of time, the processing speed determination unit 33 performs the processing in step S8 to determine whether or not the current change ratio $\Delta I_r$ detected by the change ratio detection unit 32 is greater than the current change ratio threshold value $\Delta I_{t1}$.

Upon determining in step S8 that the current change ratio $\Delta I_r$ is greater than the current change ratio threshold value $\Delta I_{t1}$, the processing speed determination unit 33 performs the processing in step S9 to determine whether or not the current value $I_{out}$ output from the voltage conversion unit 3 is greater than the high output current threshold value $I_{t2}$. Upon determining in step S9 that the current value $I_{out}$ is greater than the high output current threshold value $I_{t2}$, the processing speed determination unit 33 performs the processing in step S7 to set the computation speed change request signal $R_o$ to the high level, and ends processing in such a setting state. After ending the processing in step S7, the processing speed determination unit 33 performs processing from step S1 again.

Upon determining in step S8 that the current change ratio $\Delta I_r$ is no greater than the current change ratio threshold value $\Delta I_{t1}$, or determining in step S9 that the current value $I_{out}$ is no greater than the high output current threshold value $I_{t2}$, the processing speed determination unit 33 performs the processing in step S10 to set the computation speed change request signal $R_o$ to the low level, and ends processing in such a setting state. After ending the processing in step S10, the processing speed determination unit 33 performs processing from step S1 again.

In this way, if the current change ratio $\Delta I_r$ detected by the change ratio detection unit 32 is greater than the current change ratio threshold value $\Delta I_{t1}$ (the first threshold value) and the current value $I_{out}$ of a current output from the voltage conversion unit 3 is greater than the high output current threshold value $I_{t2}$ (the second threshold value), the processing speed determination unit 33 sets the computation speed change request signal $R_o$ to the high level and determines that the processing speed is to be a first processing speed. In contrast, if the current change ratio $\Delta I_r$ detected by the change ratio detection unit 32 is no greater than the current change ratio threshold value $\Delta I_{t1}$ (the first threshold value), or the current value $I_{out}$ of a current output from the voltage conversion unit 3 is no greater than the high output current threshold value $I_{t2}$ (the second threshold value), the processing speed determination unit 33 sets the computation speed change request signal $R_o$ to the low level and determines that the processing speed is to be the second processing speed that is lower than the first processing speed.

Figure 3:
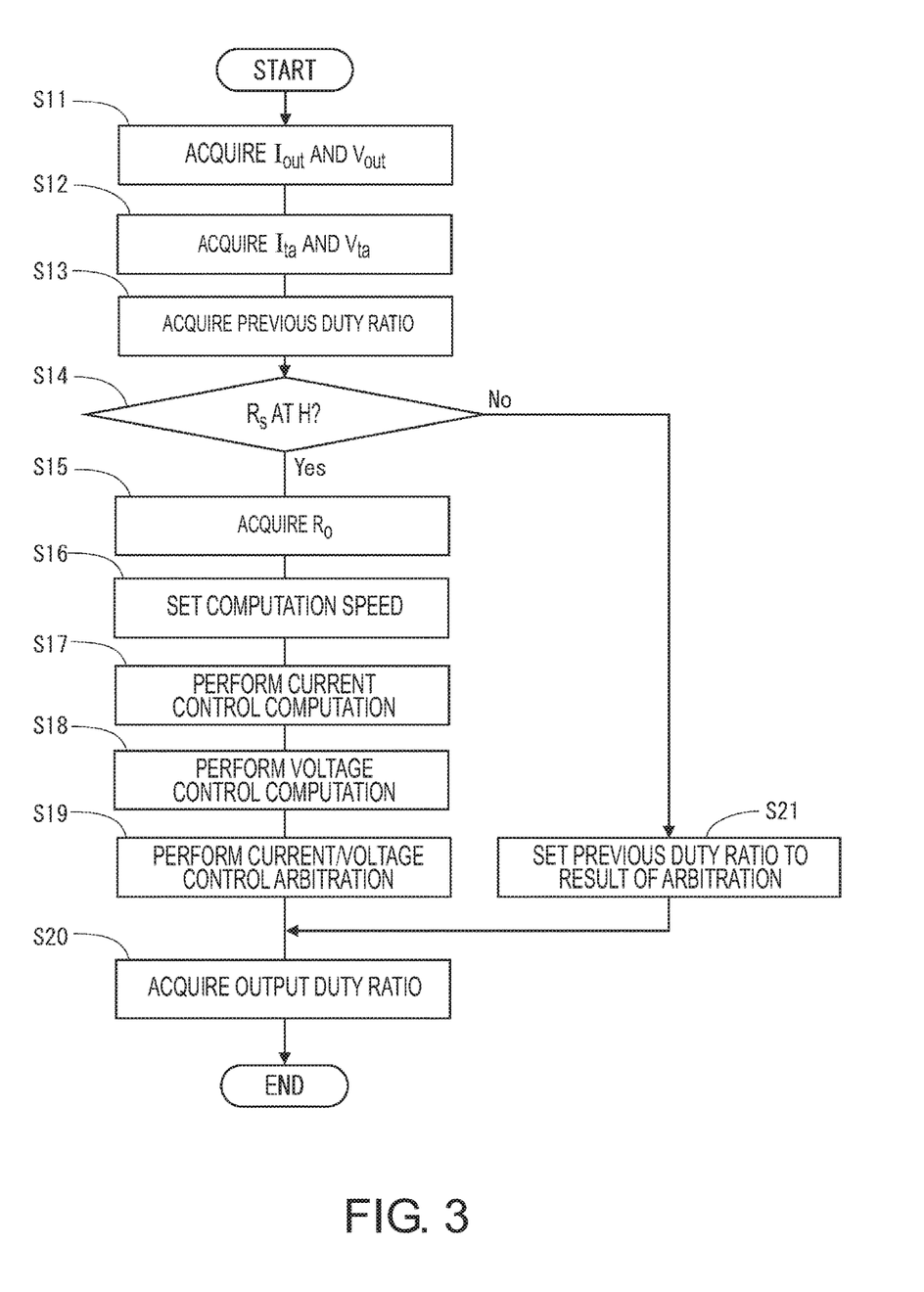
FIG. 3 is a flowchart illustrating a flow of feedback control that is performed by a control unit included in the power supply device according to the first embodiment.

Next, the following describes feedback control performed by the control unit 31 with reference to FIG. 3 and so on.

The feedback control shown in FIG. 3 is control performed by the control unit 31, and is processing that is cyclically repeated. The control unit 31 starts the control shown in FIG. 3 upon a predetermined start condition being satisfied (e.g. upon an ignition signal switching from OFF to ON), and thereafter cyclically performs the control shown in FIG. 3.

The control unit 31 acquires the current value $I_{out}$ and the voltage value $V_{out}$ based on an input value (a detection value) from the current detection unit 22 and an input value (a detection value) from the voltage detection unit 24 (step S11). Note that some of the functions of the control unit 31 are shown as deviation calculation units 34 and 35. The deviation calculation unit 34 acquires the current value $I_{out}$, and the deviation calculation unit 35 acquires the voltage value $V_{out}$.

After step S11, the control unit 31 acquires the target value $I_{ta}$ and the target value $V_{ta}$ (step S12). In the example shown in FIG. 1, the deviation calculation unit 34 acquires the target value $I_{ta}$, and the deviation calculation unit 35 acquires the target value $V_{ta}$.

After step S12, the control unit 31 acquires the duty ratio that has been set through the previous processing (i.e. the duty ratio that has been set in the previous step S20) (step S13). For example, the duty ratio set in step S20 is stored in the memory or the like of the control unit 31 every time computation is performed, and the control unit 31 acquires the previous duty ratio stored in the memory or the like through the processing in step S13 (the current duty ratio that has not been updated).

After step S13, the control unit 31 determines whether or not the wake-up signal $R_s$ is at the high level (step S14). Specifically, the control unit 31 determines whether or not the wake-up signal $R_s$, which is output from the processing speed determination unit 33 at the time when step S14 is performed, is at the high level or not. Upon determining that the wake-up signal $R_s$ is at the high level, the control unit 31 performs the processing in step S15 to acquire the computation speed change request signal $R_o$ output from the change ratio detection unit 32.

Then, after step S15, the control unit 31 sets the processing speed (the computation speed) of the control unit 31 (step S16). Specifically, if the computation speed change request signal $R_o$ that is output from the change ratio detection unit 32 when step S15 is performed is at the high level, the processing speed of the control unit 31 is set to the first processing speed (a relatively high processing speed). In this case, the processing speed is set in such a manner that, for example, the control unit 31 sets the period of the feedback control shown in FIG. 3 (the period of cycles in which the duty ratio is calculated) to a first period that is relatively short. Thus, the processing speed of the control unit 31 is increased so that at least the period of time during which feedback control is performed is reduced.

In contrast, if the computation speed change request signal $R_o$ that is output from the change ratio detection unit 32 when step S15 is performed is at the low level, the processing speed of the control unit 31 is set to the second processing speed (a relatively low processing speed) lower than the first processing speed. In this case, for example, the control unit 31 sets the period of the feedback control shown in FIG. 3 (the period of cycles in which the duty ratio is calculated) to a second period that is relatively long. Thus, the processing speed of the control unit 31 is reduced so that at least the period of time during which feedback control is performed is increased.

In this way, the control unit 31 is switchable to a first processing speed state (a high speed state), a second processing speed state (a low speed state), and a third processing speed state (a sleep state). The first processing speed state is a state in which the period of cycles of feedback control is shorter than that in the second processing speed state, and is a state in which the period of the operation clock signal of the control unit 31 (the microcomputer) is shorter than that in the second processing speed state (a state in which the clock frequency is higher than that in the second processing speed state). The third processing speed state is a state in which the period of the operation clock signal of the control unit 31 (the microcomputer) is longer than that in the second processing speed state (a state in which the clock frequency is lower than that in the second processing speed state).

After step S16, the control unit 31 performs the processing in step S17 to acquire a deviation $D_i$ between the current value $I_{out}$ output from the deviation calculation unit 34 and the target value $I_{ta}$, and determine the amount of operation (the amount of an increase or a decrease in the duty ratio) based on the deviation $D_i$, and a preset proportional gain, differential gain, and integral gain, using a well-known PID computation formula, so that the current value $I_{out}$ approaches the target value $I_{ta}$.

After step S17, the control unit 31 performs the processing in step S18, where a computation unit 37 acquires a value $D_v$ corresponding to the deviation between the voltage value $V_{out}$ output from the deviation calculation unit 35 and the target value $V_{ta}$, and determines the amount of operation (the amount of an increase or a decrease in the duty ratio) based on the value $D_v$, and a preset proportional gain, differential gain, and integral gain, using a well-known PID computation formula, so that the voltage value $V_{out}$ approaches the target value $V_{ta}$.

After step S18, the control unit 31 performs the processing in step S19. In step S19, an arbitration unit 38 determines which of the amount of operation determined in step S17 and the amount of operation determined in step S18 is to be given a higher priority (arbitration). Various methods can be conceived of to determine which is to be given a higher priority. For example, it is possible to employ a method through which a smaller amount of operation (the amount of operation that leads to a decrease in the duty ratio) out of the amounts of operation respectively determined by the computation units 36 and 37 is given a higher priority. Note that the method for determination is not limited to this method, and any other well-known method may be employed.

Upon determining in step S14 that the wake-up signal $R_s$ output from the processing speed determination unit 33 is not at the high level, the control unit 31 performs the processing in step S21 to keep the duty ratio that has been set through the previous feedback control. That is, when performing the processing in step S21, the control unit 31 keeps the previous duty ratio without updating it, and uses the duty ratio as the result of arbitration.

After step S19 or step S21, the control unit 31 performs step S20 to set the duty ratio based on the result of the processing performed in step S19 or step S21. In the case of performing step S20 after step S19, the arbitration unit 38 adds the amount of operation determined in step S19 to the previous duty ratio, and sets the result as a new duty ratio. In the case of performing step S20 after step S21, the arbitration unit 38 sets the previous duty ratio as a new duty ratio. In the case where the arbitration unit 38 has set a new duty ratio in step S20, the arbitration unit 38 continuously outputs a PWM signal corresponding to this duty ratio to the voltage conversion unit 3, at least until the next time the processing in step S20 is performed. Note that, after setting the duty ratio in step S20, the control unit 31 performs computation from step S11 again.

Figure 4:
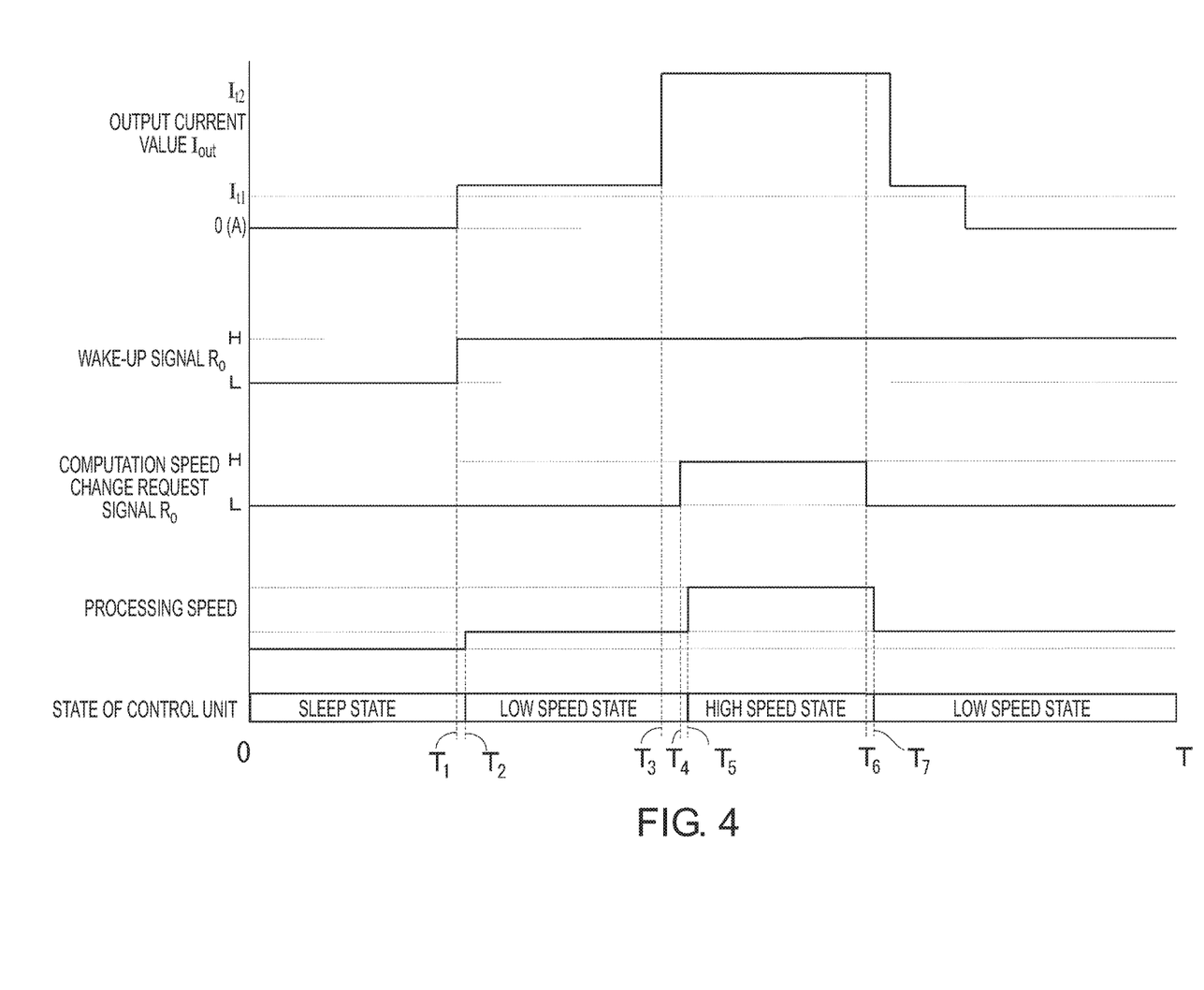
FIG. 4 is a timing chart schematically showing an example of changes in an output current from the power supply device according to the first embodiment, and examples of changes in a wake-up signal, a computation speed change request signal, a processing speed of a microcomputer, and the microcomputer in response to the changes in the output current.

Next, mainly with reference to FIG. 4, the following describes an example of changes in the current value $I_{out}$, and examples of changes in the wake-up signal $R_s$, the computation speed change request signal $R_o$, the processing speed of the control unit 31, and the state of the control unit 31 in response to the changes in the current value $I_{out}$.

In the examples shown in FIG. 4, the control unit 31 is kept in a sleep state while the output current value $I_{out}$ from the voltage conversion unit 3 is lower than the low output current threshold value $I_{t1}$. In the examples shown in FIG. 4, when the control unit 31 is in a sleep state, the output current value $I_{out}$ changes due to, for example, changes in a load, and the output current value $I_{out}$ exceeds the low output current threshold value $I_{t1}$ at a point in time $T_1$. Therefore, the processing speed determination unit 33 makes an affirmative determination (Yes) in step S3 in FIG. 2 at almost the same time as the point in time $T_1$, and switches the wake-up signal $R_s$ from the low level to the high level (step S4 in FIG. 2). Upon the wake-up signal $R_s$ being switched to the high level by the processing speed determination unit 33 in this way, the state of the control unit 31 changes from the sleep state to a predetermined c state at a point in time $T_2$ that is immediately after the switching. Thus, the processing speed of the control unit 31 becomes higher than that in the sleep state.

Note that the sleep state may be, for example, a state in which the operation clock signal of the control unit 31 is not generated, or a state in which the period of the operation clock signal of the control unit 31 is long. The low speed state may be, for example, a state in which some of the functions of the control unit 31 are stopped, a state in which the period of the operation clock signal of the control unit 31 is longer than that in a high speed state described below (i.e. a state in which the clock frequency (the operation frequency) is low), or a state in which both are true. The power consumption of the control unit 31 corresponds to the processing speed, and is higher in the low-speed state than in the sleep state.

When the control unit 31 is in the sleep state, an operation clock signal is stopped or an operation clock with a period that has been set to a third period is generated, and when the control unit 31 is in the low speed state, an operation clock signal with a period that has been set to a second period is generated. In the sleep state, if the operation clock signal of the control unit 31 has the third period, the aforementioned second period is shorter than the aforementioned third period. Also, the execution period (the computation period) of the feedback control in FIG. 3 performed by the control unit 31 is shorter in the low speed state than in the sleep state.

In the examples in FIG. 4, after the state of the control unit 31 changes from the sleep state to the low speed state at the point in time $T_2$, the current value $I_{out}$ sharply changes at a point near a point in time $T_3$. At a point near the point in time $T_3$, at which such a change occurs, the current change ratio $\Delta I_r$ is greater than the current change ratio threshold value $\Delta I_{t1}$, and the current value $I_{out}$ is greater than the high output current threshold value $I_{t2}$. Due to such a change occurring, the processing speed determination unit 33 makes an affirmative determination (Yes) in step S8 in FIG. 2, makes an affirmative determination (Yes) in step S9 as well, and switches the computation speed change request signal $R_o$ from the low level to the high level at a point in time $T_4$ according to the results of determination. Upon the computation speed change request signal $R_o$ being switched to the high level by the processing speed determination unit 33 in this way, the state of the control unit 31 changes from the low speed state to a predetermined high speed state at a point in time $T_5$ that is immediately after the switching. Thus, the processing speed of the control unit 31 becomes higher than that in the low speed state.

When the control unit 31 is in the low speed state, an operation clock signal with a period that has been set to the second period is generated, and when the control unit 31 is in the high speed state, an operation clock signal with a period that has been set to the first period is generated. The aforementioned first period is shorter than the aforementioned second period. Also, the execution period (the computation period) of the feedback control in FIG. 3 performed by the control unit 31 is shorter in the high speed state than in the low speed state.

In the example shown in FIG. 4, after the state of the control unit 31 changes from the low speed state to the high speed state at a point in time $T_5$, a condition for switching from the high-speed state to the high speed state (the condition that a predetermined period has elapsed from when the computation speed change request signal $R_o$ was switched to the high level, and $\Delta I_r \leq \Delta I_{t1}$ or $I_{out} \leq I_{t2}$ is satisfied) is satisfied, and the computation speed change request signal $R_o$ is switched to the low level at a point in time $T_6$. Upon the computation speed change request signal $R_o$ being switched to the low level by the processing speed determination unit 33 in this way, the state of the control unit 31 changes from the high speed state to the low speed state at a point in time $T_7$ that is immediately after the switching. Thus, the processing speed of the control unit 31 becomes lower than that in the high speed state.

As described above, the power supply device 1 detects the change ratio of a current output from the voltage conversion unit 3, using the change ratio detection unit 32, and the processing speed determination unit 33 determines the processing speed in such a manner that the greater the current change ratio $\Delta I_r$ detected by the change ratio detection unit 32 is, the higher the speed is. Then, the control unit 31 operates at the processing speed determined by the processing speed determination unit 33. With this configuration, when the change ratio $\Delta I_r$ of an output current becomes relatively large due to changes in a load, the processing speed of the control unit 31 can be increased so as to be relatively high. That is, when the output current greatly changes, it is possible to improve the ability to follow the target value by increasing the processing speed, and thus it is possible to reliably prevent stability from being degraded due to changes in a load, for example. In addition, the processing speed is determined based on the change ratio $\Delta I_r$ of the current output from the voltage conversion unit 3, and therefore, when the processing speed determination unit 33 determines the processing speed, the processing speed swiftly reflects the state of changes in the output current, and thus the responsivity of feedback control can be improved. On the other hand, when the change ratio of the output current is relatively small, it is possible to reduce the processing speed of the control unit 31 so as to be relatively low. That is, in a situation where the change ratio $\Delta I_r$ of the output current is relatively small and stability is unlikely to be degraded, it is possible to keep the processing speed of the control unit 31 low to reduce power consumption.

Therefore, it is possible to realize a power supply device 1 that can perform feedback control with high responsivity when an output current greatly changes, with a configuration that can further reduce power consumption.

If the change ratio $\Delta I_r$ detected by the change ratio detection unit 32 is greater than the current change ratio threshold value $\Delta I_{t1}$ (the first threshold value), and the current value $I_{out}$ of a current output from the voltage conversion unit 3 is greater than the high output current threshold value $I_{t2}$ (the second threshold value), the processing speed determination unit 33 determines that the processing speed is to be the first processing speed, and if the change ratio $\Delta I_r$ detected by the change ratio detection unit 32 is no greater than the current change ratio threshold value $\Delta I_{t1}$ (the first threshold value), or the current value $I_{out}$ of a current output from the voltage conversion unit 3 is no greater than the high output current threshold value $I_{t2}$ (the second threshold value), the processing speed determination unit 33 determines that the processing speed is to be the second processing speed that is lower than the first processing speed.

The influence of changes in output caused by changes in a load, for example, is more likely to be problematic when the output current is relatively large than when the output current is relatively small. With the present configuration, in a situation where the change ratio of the output current is relatively large and the output current is relatively large, it is possible to give a higher priority to the processing speed and improve the ability to follow the target value so that the above-described problem is less likely to occur. In contrast, even if the change ratio of the output current is relatively large, in a situation where the output current is relatively small, it is possible to preferentially reduce power consumption by keeping the processing speed to be low.

The processing speed determination unit 33 is configured such that, after switching the processing speed from the second processing speed to the first processing speed, the processing speed determination unit 33 prohibits switching from the first processing speed to the second processing speed for at least a predetermined period of time, and after the predetermined period of time has elapsed from when the processing speed determination unit 33 has switched the processing speed from the second processing speed to the first processing speed, the processing speed determination unit 33 switches the processing speed from the first processing speed to the second processing speed when the current change ratio $\Delta I_r$ detected by the change ratio detection unit 32 is no greater than the current change ratio threshold value $\Delta I_{t1}$ (the first threshold value) or when the current value $I_{out}$ output from the voltage conversion unit 3 is no greater than the high output current threshold value $I_{t2}$ (the second threshold value). In this way, after the processing speed has been switched from the second processing speed to the first processing speed, switching from the first processing speed to the second processing speed is prohibited for at least a predetermined period of time. Thus, it is possible to reduce the frequency at which the processing speed is switched to the relatively low processing speed (the second processing speed), and it is possible to prevent followability from decreasing due to the processing speed frequently switching to the second processing speed.

Figure 5:
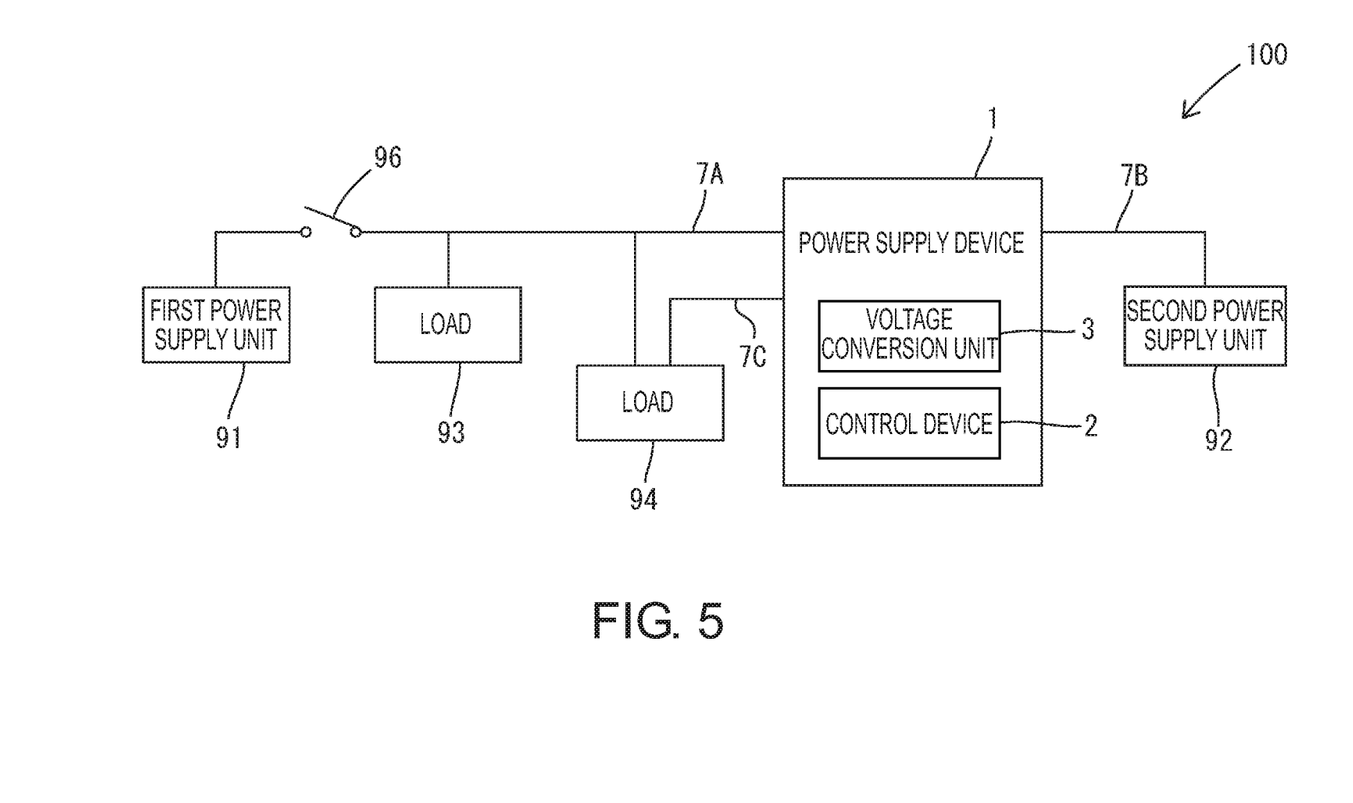
FIG. 5 is a block diagram illustrating an on-board system to which the power supply device according to the first embodiment is applied.

It is effective if the above-described power supply device 1 is applied to an on-board system 100 shown in FIG. 5. The system shown in FIG. 5 is configured such that the first power supply unit 91 is configured as a main power supply such as a lead-acid battery, and a load 93 and a load 94 are connected to the first power supply unit 91. The load 94 can be a load that is desired to be supplied with power even when the first power supply unit 91 fails (e.g. an electrical parking brake device). Although not shown in the drawing, a power generator, for example, is also electrically connected to the first power supply unit 91. A DC voltage from the first power supply unit 91 (the main power supply) is applied to the conductive path 7A. On the other hand, the second power supply unit 92 is configured as a sub power supply such as an electric double-layer capacitor or a lithium ion battery, and a DC voltage from the second power supply unit 92 (the sub power supply) is applied to the conductive path 7B. For example, the output voltage of the first power supply unit 91 (the main power supply) when fully charged is greater than the output voltage of the second power supply unit 92 (the sub power supply) when fully charged, and the power supply device 1 is configured to be able to perform a voltage conversion operation to step down or step up a DC voltage input to the conductive path 7A and output the resulting voltage to the conductive path 7B, and a voltage conversion operation to step up or step down a DC voltage input to the conductive path 7B and output the resulting voltage to the conductive path 7A or a conductive path 7C. When a voltage conversion operation is to be performed to output a voltage to the conductive path 7A or the conductive path 7C, the power supply device 1 may operate such that the voltage conversion unit 3 applies a voltage resulting from voltage conversion to both the conductive path 7A and the conductive path 7C, or to only the conductive path 7A or only the conductive path 7C.

A switch unit 96 is provided between the first power supply unit 91 (the main power supply) and the power supply device 1, and, by causing the switch unit 96 to perform an OFF operation, it is possible to bring the path between the first power supply unit 91 (the main power supply) and the power supply device 1 into an electrically disconnected state in specific situations (e.g. when the main power supply fails, and when a ground fault occurs on the main power supply side). Also, even when the switch unit 96 is in an OFF state, it is possible to supply the load 94 or the like with power from the second power supply unit 92 (the sub power supply) when the power supply device 1 performs a step up operation.

In such an on-board system 100, when a specific situation (e.g. a ground fault on the main power supply side) occurs and the switch unit 96 performs an OFF operation, the load 94 or the like needs to operate using power from the second power supply unit 92 (the sub power supply). Therefore, it is necessary to reduce the power consumption of the power supply device 1 as much as possible. Regarding this issue, the power supply device 1 with the present configuration can suppress power consumption as described above. Therefore, it is advantageous to apply the power supply device 1 to such a system. Also, although there is a concern that the output will be unstable due to changes in a load when the path between the first power supply unit 91 (the main power supply) and the power supply device 1 is switched to an electrically disconnected state and the load 94 or the like operates using the second power supply unit 92 (the sub power supply), measures to stabilize the output are employed in the above-described power supply device 1, and the power supply device 1 is also advantageous in this point.

Figure 6:
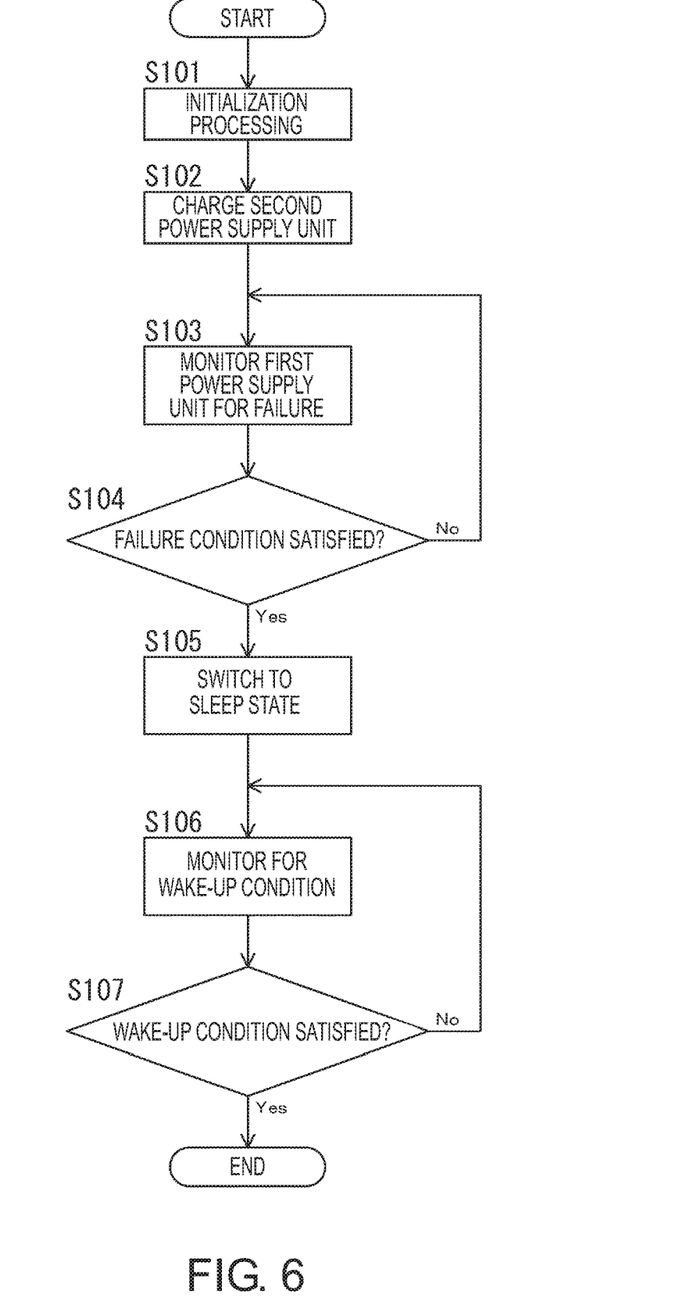
FIG. 6 is a flowchart illustrating a flow of control in a case where the power supply device according to the first embodiment is applied to the on-board system shown in FIG. 5.

With this configuration, the control device 2 can perform control following the flow shown in FIG. 6, for example. The control shown in FIG. 6 is performed by the control device 2 at a predetermined point in time (e.g. a point in time when a start-up switch (such as an ignition switch) is switched from an OFF state to an ON state). The control device 2 first performs predetermined initialization processing in step S101, and starts charging the second power supply unit 92 in step S102. When the control device 2 starts charging in step S102, the control unit 31 operates the voltage conversion unit 3 to perform a voltage conversion operation to step down or step up a DC voltage applied to the conductive path 7A and output the resulting voltage to the conductive path 7B, and thus charges the second power supply unit 92 (the sub power supply) using power from the first power supply unit 91 (the main power supply). Note that the control unit 31 charges the second power supply unit 92 until the output voltage (the charged voltage) of the second power supply unit 92 reaches a predetermined target voltage.

After the control device 2 has started charging the second power supply unit 92 or has finished charging the second power supply unit 92 in step S102, the processing speed determination unit 33 monitors the first power supply unit 91 for a failure (step S103). When monitoring of the first power supply unit 91 for a failure is performed in step S103, such monitoring is performed until a failure condition regarding the first power supply unit 91 is satisfied. Specifically, for example, the processing speed determination unit 33 monitors a voltage applied to the first conductive path 7A to determine whether or not the voltage has dropped to be less than a predetermined threshold value. If the voltage applied to the first conductive path 7A is no less than the predetermined threshold value, the processing speed determination unit 33 determines that the failure condition regarding the first power supply unit 91 is not satisfied, and returns to step S103 to continue monitoring the first power supply unit 91 for a failure state. On the other hand, if the voltage applied to the first conductive path 7A has dropped to be less than the predetermined threshold value, the processing speed determination unit 33 determines in step S104 that the failure condition regarding the first power supply unit 91 is satisfied, proceeds to step S105, and switches the wake-up signal $R_s$ to the low level to bring the control unit 31 into a sleep state. In this way, when the first power supply unit 91 fails, the control unit 31 is switched to a sleep state, and thus power consumption is reduced.

After switching the wake-up signal $R_s$ to the low level and bringing the control unit 31 into a sleep state in step S105, the processing speed determination unit 33 monitors for a wake-up condition in step S106. Monitoring for the wake-up condition performed in step S106 continues until the wake-up condition is satisfied. The wake-up condition is the condition for switching the wake-up signal $R_s$ from the low level to the high level, and is the condition that "the current value $I_{out}$ is greater than the low output current threshold value $I_{t1}$". If the wake-up condition is satisfied, the result of step S107 is "Yes" and the processing speed determination unit 33 ends the control shown in FIG. 6.

In the control shown in FIG. 6, a state in which "No" is repeated in step S107 corresponds to a state in which negative determination ("No") is repeated in step S3 of the control shown in FIG. 2, which is repeatedly performed. Determination in step S107 corresponds to determination in step S3 shown in FIG. 2, and a case in which the result of step S107 is "Yes" corresponds to a case in which the result of step S3 shown in FIG. 2 is "Yes".

Note that the control shown in FIG. 6 may be forcibly stopped when a predetermined stopping condition is satisfied (e.g. when a start-up switch (such as an ignition switch) is switched to an OFF state).

Other Embodiments

The present invention is not limited to the first embodiment that has been described based on the descriptions above and the drawings, and, for example, the following embodiments are included in the technical scope of the present invention.

(1) In the first embodiment, the voltage detection unit and the current detection unit are provided on the second conductive path 7B. However, the voltage detection unit and the current detection unit may be provided on the first conductive path 7A.

(2) In the first embodiment, the wake-up signal and the computation speed change request signal are switched using a hardware circuit (the processing speed determination unit 33) that is separate from the control unit 31. However, the control unit 31 may have such a function.

(3) The first embodiment shows an example in which the control unit 31 is constituted by a microcomputer. However, the control unit 31 may be constituted by a hardware circuit other than a microcomputer.

(4) The first embodiment shows an example of a configuration in which the range of the change ratio of the output current is divided into two ranges, namely a range in which the change ratio is greater than the current change ratio threshold value $\Delta I_{t1}$ and a range in which the change ratio is no greater than $\Delta I_{t1}$, and the processing speed of the control unit 31 is switched to two levels, namely the low speed state and the high speed state, based on which of the ranges the change ratio $\Delta I_r$ belongs to. However, it is possible to divide the range of the change ratio of the output current into three or more ranges, and the processing speed of the control unit 31 may be switched to many levels, i.e. three or more levels, such that the higher range the change ratio belongs to, the higher the processing speed is. For example, it is possible that: in a case where the change ratio $\Delta I_r$ is in a first range and the output current is greater than the high output current threshold value, the period of the operation clock signal of the control unit 31 is set to a first period, and the period of feedback computation shown in FIG. 3 is set to a first setting period; in a case where the change ratio $\Delta I_r$ is in a second range (a range in which values are smaller than those in the first range) and the output current is greater than the high output current threshold value, the period of the operation clock signal of the control unit 31 is set to a second period (a period longer than the first period), and the period of feedback computation shown in FIG. 3 is set to a second setting period (a period longer than the first setting period); and in a case where the change ratio $\Delta I_r$ is in a third range (a range in which values are smaller than those in the second range), or the output current is no greater than the high output current threshold value, the period of the operation clock signal of the control unit 31 is set to a third period (a period longer than the second period), and the period of feedback computation shown in FIG. 3 is set to a third setting period (a period longer than the second setting period).

(5) In the first embodiment, it is determined that the processing speed of the control unit 31 is to be the above-described first processing speed when the change ratio $\Delta I_r$ detected by the change ratio detection unit 32 is greater than the predetermined first threshold value and the current value $I_{out}$ of the current output from the voltage conversion unit 3 is greater than the predetermined second threshold value. However, for example, the processing performed in step S9 in FIG. 2 may be omitted, and it may be determined that the processing speed of the control unit 31 is to be the above-described first processing speed when the change ratio $\Delta I_r$ detected by the change ratio detection unit 32 is greater than the predetermined first threshold value, and is to be set to the above-described second processing speed when the change ratio $\Delta I_r$ detected by the change ratio detection unit 32 is no greater than the predetermined first threshold value.

(6) In the first embodiment, when the processing speed of the control unit 31 (a microcomputer) is in the low speed state, the clock frequency (the operation frequency) is 0.1 kHz to 1 kHz, for example. However, the clock frequency is not limited to this range, and may be lower than 0.1 kHz, and may be higher than 1 kHz.

(7) In the first embodiment, when the processing speed of the control unit 31 (a microcomputer) is in the high speed state, the clock frequency (the operation frequency) is 10 kHz to 50 kHz, for example. However, the clock frequency is not limited to this range, and may be lower than 10 kHz, and may be higher than 50 kHz.

(8) In the first embodiment, the predetermined period of time used in step S6 in FIG. 2 is 10 ms. However, the period of time may be longer than 10 ms, and may be shorter than 10 ms.

LIST OF REFERENCE NUMERALS

1: Power Supply Device
2: Control Device
3: Voltage Conversion Unit
31: Control Unit
32: Change Ratio Detection Unit
33: Processing Speed Determination Unit

The invention claimed is:

1. A power supply device comprising:
a voltage conversion circuit that steps up or steps down an input voltage, using a switching element that performs ON and OFF operations in response to a PWM signal, and outputs a resulting voltage;
a control device configured to:
   detect a change ratio of a current output from the voltage conversion circuit;
   determine a processing speed in such a manner that a larger the detected change ratio, a higher a speed is; and
   operate at the determined processing speed, that computes a duty ratio of a PWM signal that is to be supplied, based on a predetermined target value and an output value from the voltage conversion circuit, and that performs feedback control to output, to the voltage conversion circuit, a PWM signal that has been set so as to have the duty ratio obtained through the computation,
wherein the control device:
   determines that the processing speed is to be a first processing speed when the detected change ratio is greater than a predetermined first threshold value and the value of a current output from the voltage conversion circuit is greater than a predetermined second threshold value, and
   determines that the processing speed is to be a second processing speed that is lower than the first processing speed when the detected change ratio is no greater than the predetermined first threshold value, or when the value of a current output is no greater than the predetermined second threshold value.

2. The power supply device according to claim 1, wherein, after switching the processing speed from the second processing speed to the first processing speed, the control device prohibits switching from the first processing speed to the second processing speed for at least a predetermined period of time, and after the predetermined period of time has elapsed from when the processing speed has been switched from the second processing speed to the first processing speed, the control device switches the processing speed from the first processing speed to the second processing speed when the detected current change ratio is no greater than the predetermined first threshold value or when the value of a current output from the voltage conversion circuit is no greater than the predetermined second threshold value.

* * * * *

UNITED STATES PATENT AND TRADEMARK OFFICE
CERTIFICATE OF CORRECTION

PATENT NO. : 10,326,368 B2  
APPLICATION NO. : 16/094115  
DATED : June 18, 2019  
INVENTOR(S) : Takeshi Hasegawa et al.

Page 1 of 1

It is certified that error appears in the above-identified patent and that said Letters Patent is hereby corrected as shown below:

On the Title Page

Item (86):  
Cancel the text "PCT No.: PCT/JP2017/003531"  
And Insert -- PCT No.: PCT/JP2017/002531 --

Signed and Sealed this  
Twentieth Day of August, 2019

Andrei Iancu  
*Director of the United States Patent and Trademark Office*